United States Patent Office 3,202,654
Patented Aug. 24, 1965

3,202,654
6-[α - HYDROXY- AND α-AMINO-α-PYRROLYLA-CETAMIDO] PENICILLANIC ACIDS AND SALTS THEREOF
Yvon Gaston Perron, Ville d'Anjou, Quebec, Canada, assignor to Bristol-Myers Company, New York, N.Y., a corporation of Delaware
No Drawing. Filed Apr. 8, 1963, Ser. No. 271,516
10 Claims. (Cl. 260—239.1)

This application is a continuation-in-part of my prior, copending application Serial No. 190,774, filed April 27, 1962, and now abandoned.

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and, more particularly, relates to 6-[α-hydroxy-α-(2-substituted pyrrolyl)acetamido]penicillanic acid and 6-[α-amino-α-(2-substituted pyrrolyl)acetamido]penicillanic acid and nontoxic salts thereof.

Antibacterial agents such as benzylpenicillin have proved highly effective in the past in the therapy of infections due to Gram-positive bacteria but such agents suffer from the serious drawbacks of being unstable in aqueous acid, e.g. upon oral administration, and of being ineffective against numerous strains of bacteria, e.g. most Gram-negative bacteria. The compounds of the present invention are particularly useful in that they possess potent antibacterial activity against both Gram-positive and Gram-negative bacteria upon either parenteral oral administration and also exhibit resistance to destruction by acid and penicillinase.

There is provided, according to the present invention, a member selected from the group consisting of the acids having the formulae (I) 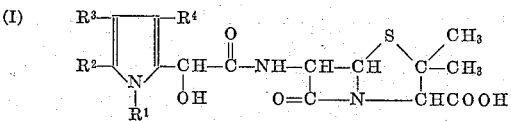

and (II) 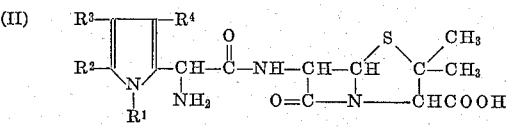

wherein $R^1$ is a member selected from the group consisting of hydrogen, (lower)alkyl, phenyl, chlorophenyl, phenethyl, (lower)alkanoyl, (lower)alkylsulfonyl and cycloalkyl radicals having from 5 to 7 carbon atoms inclusive and wherein $R^2$, $R^3$ and $R^4$ are each a member selected from the group consisting of hydrogen, chloro, bromo, fluoro, iodo, nitro, (lower)alkyl, (lower)alkoxy, (lower)-alkylthio, di(lower)alkylamino, (lower)alkanoylamino, (lower)alkanoyl and (lower)alkylsulfonyl, and the nontoxic, pharmaceutically acceptable salts thereof. Such salts include the nontoxic carboxylic acid metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidine, (e.g. N-ethylpiperidine) and other amines which have been used to form salts with benzylpenicillin and, in the case of the α-amino compounds of Formula II above, the pharmaceutically acceptable nontoxic acid addition salts thereof (i.e. the amine salts), including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate fumarate, malate, mandelate, ascorbate and the like. Also included within the scope of the present invention are easily hydrolyzed esters or amides which are converted to the free acid form by chemical or enzymatic hydrolysis.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. "(lower) alkoxy," it refers to the alkyl portion of such group which is therefore as described above in connection with "(lower)alkyl."

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower)-alkanoyl includes acetyl, propionyl, butyryl, etc.; (lower)-alkylsulfonyl includes methylsulfonyl, ethylsulfonyl, hexylsulfonyl, etc.; di(lower)alkylamino includes dimethylamino, diethylamino, ethylmethylamino, etc.

The α-carbon atom of the acyl group (to which the hydroxyl or amino group is attached) is an asymmetric carbon atom and the compounds of this invention can therefore exist in two optically active isomeric forms (the D- and L-diastereoisomers), as well as in a mixture of the two optically active forms; all such isomeric forms of the compounds are included within the scope of the present invention. Also included within the scope of the present invention are easily hydrolyzed esters which are converted to the free acid form by chemical or enzymatic hydrolysis.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

A preferred group of compounds of Formulae I and II are those in which $R^1$ is hydrogen and at least one of $R^2$, $R^3$ and $R^4$ is hydrogen; thus the pyrrolyl moiety of such preferred compounds can be represented by the formula (V) 

wherein $R^2$ and $R^3$ each have the meaning set forth above. Of these preferred compounds, a preferred subgroup is that wherein $R^2$ and $R^3$ are selected from the group consisting of hydrogen, (lower)alkoxy and chloro.

There is also provided by the present invention a group of α-keto penicillins having the formula (VI) 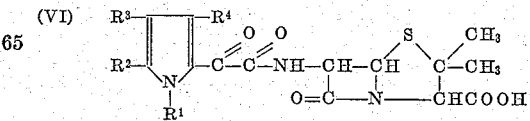

wherein $R^1$, $R^2$, $R^3$ and $R^4$ each have the meaning set forth above in connection with the compounds of Formulae I and II above, and the carboxylic acid salts thereof, including those set forth above in connection with the acids of Formulae I and II above. A preferred group of these α-keto penicillins are those in which the pyrrolyl moiety is as defined above in Formula V.

These α-keto penicillins, which are also useful antibacterial agents, are also useful in the preparation of α-hydroxy-α-(2-pyrrolyl)methylpenicillins and similar α-hydroxypenicillins. These α-keto penicillins of Formula VI above are prepared by the reaction of 6-aminopenicillanic acid, preferably in the form of a neutral salt such as the sodium, potassium or triethylamine salt, with an acid chloride having the formula (VII) 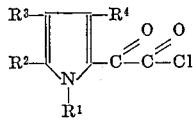

wherein $R^1$, $R^2$, $R^3$ and $R^4$ each have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid. The α-keto penicillins of the present invention can also be prepared by the use of an acid azide or a carbodiimide reagent as described by Sheehan and Hess, J. Amer. Chem. Soc., 77, page 1067 (1955). General methods for the prepartaion and purification of the α-keto penicillins of the present invention according to the mixed anhydride procedure and the acid chloride procedure are described and illustrated in U.S. Patent Nos. 2,941,995, 2,996,501, 2,985,648 and 2,951,839.

The substituted α-amino-α-(2-pyrrolyl)acetic acids and the α-(2-pyrrolyl)-α-keto acetic acids and the corresponding acetyl chlorides which are used in the preparation of the compounds of the present invention can be prepared by a variety of synthetic methods which are common in the art. Most of these starting compounds are described in the prior art and many of them are commercially available. Detailed discussions of methods for the preparation of these starting materials are found in such reference works as the "Chemistry of Carbon Compounds," E. H. Rodd, editor (1956), Elsevier Publishing Company. The preparation of 2-pyrrolylglyoxylic acid chloride is illustrative of such methods of preparation and is set forth in the examples below. The acids may be prepared according to the procedures described generally in J. Amer. Chem. Soc., 66, 1645–1648 (1944), by means of a Friedel-Crafts type reaction with the appropriate pyrrole compound and a chloride of oxalic acid.

The preferred α-hydroxypenicillins of the present invention, as pointed out in Formula I above, are prepared by first preparing the appropriate α-keto penicillin as described above and then contacting such α-keto penicillin or a salt thereof in a liquid medium with at least one equivalent of a member selected from the group consisting of sodium borohydride, sodium trimethoxyborohydride and potassium borohydride to produce the corresponding hydroxypenicillin and salts thereof. More specifically, the process for the production of hydroxypenicillins comprises contacting in a substantially aqueous medium at a pH greater than about 7 and at a temperature in the range of about −5° C. to about 40° C. a member selected from the group consisting of an α-keto penicillin described in Formula VII above and salts thereof with from 1 to 12 equivalents of a member selected from the group consisting of sodium borohydride, sodium trimethoxyborohydride and potassium borohydride to produce the corresponding hydroxypenicillin and salts thereof. When used as intermediates in the chemical process for the production of the α-hydroxypenicillins, the α-keto penicillins of Formula V may be used either in the acid form or as a salt; it is not necessary that the salts be non-toxic, but the cation should be one which does not interfere with the chemical reduction reaction.

A preferred process for the preparation of the α-hydroxypenicillins of the present invention comprises contacting in a substantially aqueous medium at a pH greater than about 7 and at a temperature in the range of about −5° C. to about 40° C. a member selected from the group consisting of keto penicillins having the formula (VIII) 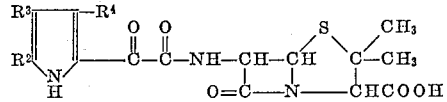

wherein $R^2$, $R^3$ and $R^4$ have the meaning set forth above, and salts thereof with from 1 to 12 equivalents of a member selected from the group consisting of sodium borohydride and potassium borohydride to produce a member selected from the group consisting of the corresponding hydroxypenicillin and salts thereof. Thus in the preparation of the preferred penicillin of this invention, 6-[α-hydroxy-α-(2-pyrrolyl)acetamido]penicillanic acid, the appropriate α-keto penicillin, the potassium salt of 6-[2-pyrrolylglyoxylamido]penicillanic acid, is first prepared by the acid chloride procedure which is described above and which is illustrated in Example 2 below, and this α-keto penicillin is then reduced with sodium borohydride, as illustrated in Example 3 below. The preparation of the borohydrides and certain methods of their use are described in United States Patent No. 2,683,721.

The α-amino penicillins of Formula II above can be prepared by reaction of 6-aminopenicillanic acid, preferably in the form of a neutral salt such as the sodium salt or the triethylamine salt, with an acid chloride having the formula

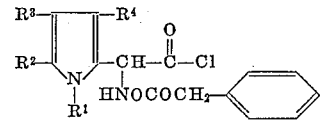

wherein $R^1$, $R^2$, $R^3$ and $R^4$ have the meanings set forth above, or its functional equivalent as an acylating agent for a primary amino group and thereafter removing the protecting group from the amino radical by hydrogenation under sufficiently mild conditions to avoid destruction of the penicillin nucleus. The protecting group, $PhCH_2OCO$—, in the formula above may, of course, be replaced by another functionally equivalent protecting group as set forth below. The functional equivalents of the acid chloride set forth above include the corresponding carboxylic acid bromides, acid anhydrides and mixed anhydrides with other carboxylic acids, including monoesters, and particularly lower aliphatic esters, of carbonic acid.

The protected amino acid can be prepared by the method described in Example 15 below, which method is also discussed in "A Textbook of Biochemistry," by P. H. Mitchell, at page 113. In the next step, the 6-aminopenicillanic acid may be reacted with a mixed anhydride prepared by reacting the amino-substituted carboxylic acid, or a salt thereof, having its groups protected, with an ester of chlorocarbonic acid, e.g. ethyl chlorocarbonate. Alternatively, the protected amino-substituted carboxylic acid may be converted to a reactive acid halide which is then used to acylate 6-aminopenicillanic acid.

The several methods used to form the aminoacyl derivatives of 6-aminopenicillanic acid (in which the amino group of the amino acid is protected) are standard procedures employed in peptide synthesis and include the use of a reactive acid azide or a carbodiimide reagent cf. Sheehan and Hess, J. Amer. Chem. Soc., 1955, 77, 1067. The subsequent removal of the protecting group to form the free amino-substituted penicillin is effected by catalytic hydrogenation. Suitable protecting groups are of the general formula R″O·CO—, where R″ is an allyl, benzyl (as shown in the formula above), substituted benzyl, phenyl, or substituted phenyl group, or the trityl group Ph₃·C—. The abbreviation "Ph" as used herein represents the phenyl group. The "carbobenzoxy" group (PhCH₂OCO—) is also sometimes referred to herein as the "carbobenzyloxy" group. These acylation procedures and methods for recovery of the resulting penicillins are further described and exemplified in United States Patent Nos. 2,985,648 and 3,078,268.

The diastereoisomers of the compounds of Formula II can be prepared by first preparing the appropriate amino acid having its amino group protected, e.g., DL-α-(carbobenzoxyamino)-α-(2-pyrrolyl)acetic acid (the optically inactive racemic mixture of the optically active forms), and then separating the optically active forms of such acid, e.g. by way of their salts with optically active bases such as quinine, brucine, etc. and employing the appropriate form in the acylation of 6-aminopenicillanic acid. Thus DL-α-(carbobenzoxyamino)-(2-pyrrolyl)acetic acid can be resolved to obtain D(—)-α-(carbobenzoxyamino)-2-(2-pyrrolyl)acetic acid and L(+)-α-carbobenzoxyamino)-2-(2-pyrrolyl)acetic acid, each of which can be reacted with 6-aminopenicillanic acid as illustrated in Example 15 to produce D(—)-6-[α-amino-α-(2-pyrrolyl)acetamido]penicillanic acid and L(+)-6-[α-amino-α-(2-pyrrolyl)acetamido]penicillanic acid, respectively.

In the exemplified process for the preparation of the compounds of Formulae I, II and VI above, the compounds are sometimes in aqueous solution in the form of their sodium or potassium salt. These compounds in the aqueous phase can then be converted to the free acid, preferably in the cold under a layer of ether by the addition of dilute mineral acid, e.g. 5 N H₂SO₄ to pH 2. The free acid can then be extracted into a water-immiscible, neutral organic solvent such as ether, the extract washed with water quickly in the cold, if desired, and dried, as with anhydrous Na₂SO₄ and the free acid recovered from the ethereal solution. The product in the ethereal extract in its free acid form can then be converted to any desired metal or amine salt, particularly the pharmaceutically acceptable nontoxic amine salts described above, by treatment with the appropriate base, e.g. a free amine such as procaine base or a solution of potassium 2-ethylhexanoate in dry n-butanol. These salts are usually insoluble in solvents such as ether and can be recovered in pure form by simple filtration.

The following examples will serve to illustrate this invention without limiting it thereto.

EXAMPLE 1

*Preparation of 2-pyrrolylglyoxylic acid chloride*

A solution containing redistilled pyrrole (63.5 gm.; 0.95 mole), 200 ml. dry diethyl ether, and 200 ml. petroleum ether (mixed lower alkanes, principally n-hexane, boiling at about from 60–68° C., available commercially under the trademark "Skellysolve B" from Skelly Oil Company) was added slowly over a period of one hour to a solution containing oxalyl chloride (112.0 gm.; 0.8 mole), 750 ml. dry ether and 750 ml. petroleum ether. The latter solution was maintained under nitrogen at —30° C. in an acetone-Dry Ice bath throughout the addition of the pyrrole solution. After the addition was completed, the reaction mixture was stirred for an additional half hour at temperatures ranging from —30° C. to 0° C. and thereafter the solvents were removed by distillation under reduced pressure. The product, 2-pyrrolylglyoxylic acid chloride, precipitated upon removal of solvents, was collected by filtration, washed with petroleum ether, dried and found to weigh 112 gm., and to melt at 72–73° C.

EXAMPLE 2

*Preparation of the potassium salt of 6-(2-pyrrolylglyoxylamido)penicillanic acid*

A solution of 2-pyrrolylglyoxylic acid chloride (20.0 gm.; 0.13 mole) in 100 ml. of acetone is added dropwise to a chilled solution (—5° C.) of 6-aminopenicillanic acid (21.6 gm.; 0.1 mole) and sodium bicarbonate (42.0 gm.; 0.5 mole) in 200 ml. of water and 100 ml. of acetone. After completion of the addition of the acid chloride solution, the reaction mixture is stirred at —5° C. for one-half hour and at room temperature for one hour. The reaction mixture is then diluted with 500 ml. of water and is extracted twice with methyl isobutyl ketone. The extracted aqueous layer is cooled and acidified (pH=2) with 6 N H₃PO₄ (40%) and then is extracted once with methyl isobutyl ketone. The extract which contains the desired product, 6-(2-pyrrolylglyoxylamido)penicillanic acid, is washed with water and dried over anhydrous sodium sulfate. Treatment of the extract with 50 ml. of a 40% butanolic solution of potassium 2-ethyl hexanoate results in the precipitation, as the potassium salt, of a small amount of the starting acid. The filtrate, which is first dried by azeotropic distillation of part of the methyl isobutyl ketone, is diluted with dry ether whereupon the product precipitates and is collected by filtration, dried in vacuo over P₂O₅ and recovered as a water-soluble powder, and found to weigh 40.0 grams (80% theory), to melt with decomposition at 120–130° C., to contain the β-lactam structure as shown by infrared analysis and to inhibit *Staph. aureus* Smith at a concentration of 1.6 mcg./ml.

EXAMPLE 3

*Preparation of potassium 6-[α-hydroxy-α-(2-pyrrolyl)-acetamido]penicillanate*

To an ice-cold solution of potassium 6-(2-pyrrolylglyoxylamido)penicillanate (37.5 gm.; 0.1 mole) in 400 ml. distilled water and sodium acetate trihydrate (13.6 gm.; 0.1 mole) there was added NaBH₄ (3.7 gm.; 0.1 mole) in portions such that the temperature did not exceed 10° C. and no reaction mixture was lost by foaming. During the addition, which required about one hour, the pH was kept at about 8 by intermittent dropwise addition of glacial acetic acid. Ether was added intermittently as needed to prevent foaming by lowering surface tension. After addition of the NaBH₄ was completed, the mixture was stirred in the ice bath for about 10 minutes, then ½ hour with the ice bath removed and transferred to a separatory funnel and extracted with 500 ml. ether. The aqueous phase was then layered with 400 ml. of ether and was then adjusted to pH 2 by the addition of 40% H₃PO₄ while being maintained cold in an ice bath. The ethereal extract containing the product, 6-[α-hydroxy-α-(2-pyrrolyl)acetamido]penicillanic acid, was then washed with two 400 ml. portions of water and dried briefly over anhydrous Na₂SO₄ and filtered. The potassium salt was formed by the addition of 40 ml. of 40% potassium-2-ethylhexanoate in n-butanol and an additional 200 ml. of n-butanol caused the product to precipitate as the potassium salt with crystallization induced by scratching. The potassium 6[α-hydroxy-α-(2-pyrrolyl)acetamido]-penicillanate was collected by filtration, found to weigh 6.0 gm., to contain the β-lactam structure and to differ from the starting keto penicillin as shown by infra-red analysis (absence of

band in the infrared spectrum), to melt with decomposition at 225° C., to inhibit *Staph. aureus* Smith at a concentration of 0.4 mcg./ml. and to exhibit versus *Staph. aureus* Smith upon intramuscular injection in mice a CD₅₀ of 0.85 mcg./kg.

EXAMPLE 4

*Preparation of a diastereoisomer of potassium 6-[α-hydroxy-α-(2-pyrrolyl)acetamido]penicillanate*

A total of 50 g. of potassium 6-[α-hydroxy-α-(2-pyrrolyl)acetamido]penicillanate obtained by the procedure of Example 3 was dissolved in a mixture of 750 ml. of n-butanol and 200 ml. of water. The solution was filtered and stored in a flask at 30° C. until crystallization began. The crystals (8 g.) were collected by filtration and were successively recrystallized from 900 ml., 700 ml. and 500 ml. portions, respectively, of wet n-butano. After the last recrystallization, there was obtained a diastereoisomer of potassium 6-[α-hydroxy-α-(2-pyrrolyl)acetamido]penicillanate, which was found to contain the β-lactam structure as shown by infrared analysis, to have rotation of $[\alpha]_D^{25} = +239°$ (C=0.5% in water), to have a decomposition point of about 225°, to inhibit *Staph. aureus* Smith at a concentration of 0.4 mcg./ml. and to exhibit versus *Staph. aureus* Smith upon intramuscular injection in mice a $CD_{50}$ of 1.1 mcg./kg.

EXAMPLE 5

*Preparation of N-phenyl-2-pyrrolylglyoxylic acid chloride*

A solution of oxalyl chloride (44.0 gm.; 0.35 mole) in 325 ml. petroleum ether (mixed lower alkanes, principally n-hexane, boiling at about 60°–68° C. available commercially under the trademark "Skellysolve B" from Skelly Oil Company) and 375 ml. dry ether is cooled to —35° C. To this solution under nitrogen is slowly added over a period of 20 minutes a solution of N-phenyl-pyrrole (50.0 gm.; 0.35 mole) in 250 ml. dry ether. After mixing the reagents are gradually brought to room temperature and then stirred for an additional ½ hour and then refluxed overnight during which evolution of HCl gas was observed. After refluxing 500 ml. of solvent is removed by evaporation, the remaining solution is filtered and then the remaining solvent removed by evaporation. The resulting product, N-phenyl-2-pyrrolylglyoxylyl chloride, is obtained as a crude oily product weighing 84 grams.

EXAMPLE 6

*Preparation of the potassium salt of 6-(N-phenyl-2-pyrrolylglyoxylamido)penicillanic acid*

A solution of crude N-phenyl-2-pyrrolylglyoxylic acid chloride (84.0 gm. crude oily product of Example 5 above) in 250 ml. of acetone is added dropwise to a chilled solution (—5° C.) of 6-aminopenicillanic acid (64.8 gms.; 0.3 mole) and sodium bicarbonate (126.0 gms.; 1.5 mole) in 600 ml. of water and 600 ml. of acetone. After completion of the addition of the acid chloride solution, the reaction mixture is stirred at —5° C. for ½ hour and at room temperature for one hour. The reaction mixture is then diluted with 500 ml. of water and is extracted twice with methyl isobutyl ketone. The extracted aqueous layer is cooled and acidified to pH 2 with 6 N $H_3PO_4$ (40%) and then is extracted once with methyl isobutyl ketone. The extract which contains the desired product, 6-(N-phenyl-2-pyrrolylglyoxylamido)penicillanic acid, is washed with water and dried over anhydrous sodium sulfate. During the drying process a precipitate, 6-(N-phenyl-2-pyrrolylglyoxylamido)penicillanic acid, forms in the extract, and is collected by filtration, found to weigh 18.0 gm., to have a melting point of 154°–155° C. with decomposition, to contain the β-lactam ring as shown by infrared analysis and to inhibit *Staph. aureus* Smith at a concentration of 0.8 mcg./ml.

Treatment of the filtered extract with 100 ml. of a 50% butanolic solution of potassium 2-ethylhexanoate results in the precipitation (as an oil) of the potassium salt of the above acid. The solvents are then removed from the precipitate by distillation and the precipitate triturated with 1.8 liters of dry ether whereupon the salt crystallizes. This potassium salt was collected by filtration, washed with dry ether and petroleum ether and dried in vacuo over $P_2O_5$. The product, potassium 6-(N-phenyl-2-pyrrolylglyoxylamido)penicillanic acid, is found to weigh 72.0 grams (80% theory), to melt with decomposition at 120°–130° C., to contain the β-lactam structure as shown by infrared analysis and to inhibit *Staph. aureus* Smith at concentrations of 0.001% by weight.

EXAMPLE 7

*Preparation of sodium 6-[α-hydroxy-α-(N-phenyl-2-pyrrolyl)acetamido]penicillanate*

To an ice-cold solution of 6-(N-phenyl-2-pyrrolylglyoxylamido)penicillanic acid (16.0 gm.) in 100 ml. distilled water and sodium acetate trihydrate (6.0 gm.) there was added $NaBH_4$ (1.0 gm.) in portions such that the temperature did not exceed 10° C. and no reaction mixture was lost by foaming. During the addition, which required about one hour, the pH was kept at about 8 by the dropwise addition of glacial acetic acid. Ether was added intermittently as needed to prevent foaming by lowering surface tension. After addition of the $NaBH_4$ was completed, the mixture was stirred in the ice bath for about 10 minutes, then ½ hour with the ice bath removed and transferred to a separatory funnel and extracted with 125 ml. ether. The aqueous phase was then layered with 100 ml. of ether and was then adjusted to pH 2 by the addition of 40% $H_3PO_4$ while being maintained cold in an ice bath. The ethereal extract containing the product, 6-[α-hydroxy-α-(N-phenyl-2-pyrrolyl)acetamido]penicillanic acid, was then washed with two 100 ml. portions of water and dried briefly over anhydrous $Na_2SO_4$ and filtered. The sodium salt was formed and precipitated as an oil by the addition of about 20 ml. of 40% sodium 2-ethylhexanoate in n-butanol. The solvent was decanted and the oil triturated with dry ether whereupon the salt crystallized. The sodium 6-[α-hydroxy-α-(N-phenyl-2-pyrrolyl)acetamido]penicillanate was collected by filtration, found to weigh 13.0 gm., to contain the β-lactam structure and to differ from the starting ketopenicillin as shown by infrared analysis (absence of

band in the infrared spectrum), to melt with decomposition at 226° C. (slowly darkens above 120° C.) and to inhibit *Staph. aureus* Smith at a concentration of 0.4 mcg./ml.

EXAMPLE 8

*Preparation of N-methyl-2-pyrrolylglyoxylic acid chloride*

A solution of oxalyl chloride (112.0 gm.; 0.88 mole) in 1000 ml. petroleum ether (mixed lower alkanes, principally n-hexane, boiling at about 60–68° C. available commercially under the trademark "Skellysolve B" from Skelly Oil Company) and 1000 ml. dry ether is cooled to —30° C. To this solution is slowly added dropwise a solution of N-methylpyrrole (60.0 gm.; 0.74 mole) in 200 ml. dry ether. After mixing, the reagents are stirred for 30 minutes on a Dry Ice-acetone bath and then for an additional ½ hour after removal of the bath. The solution is then filtered and the solvent is removed from the resulting clear yellow filtrate by evaporation at 30° C. under reduced pressure to obtain the product, N-methyl-2-pyrrolylglyoxylyl chloride, as a yellow oil weighing 124 gm.

EXAMPLE 9

*Preparation of the potassium salt of 6-(N-methyl-2-pyrrolylglyoxylamido)penicillanic acid*

A solution of crude N-methyl-2-pyrrolylglyoxylic acid chloride (40.0 gm. oily product of Example 8 above; 0.23 mole) in 200 ml. of acetone is added dropwise to a chilled solution (−5° C.) of 6-aminopenicillanic acid (43.2 gm.; 0.2 mole) and sodium bicarbonate (84 gm.; 1 mole) in 400 ml. of water and 200 ml. of acetone. After completion of the addition of the acid chloride solution, the reaction mixture is stirred at −5° C. for ½ hour and at room temperature for 1 hour. The reaction mixture is then diluted with 500 ml. of water and is extracted twice with methyl isobutyl ketone. The extracted aqueous layer is cooled and acidified to pH 2 with 6 N $H_3PO_4$ (40%) and then is extracted once with methyl isobutyl ketone. The extract which contains the desired product, 6-(N-methyl-2-pyrrolylglyoxylamido) penicillanic acid, is washed with water and dried over anhydrous sodium sulfate.

Treatment of the dried extract with 100 ml. of a 50% butanolic solution of potassium 2-ethylhexanoate results in the precipitation of the unreacted potassium salt of the above starting acid. The filtrate which is first dried by azeotropic distillation of part of the methyl isobutyl ketone is diluted with 3 liters of dry ether whereupon the product precipitates and is collected by filtration, washed with dry ether and petroleum ether and dried in vacuo over $P_2O_5$. The product, potassium 6-(N-methyl-2-pyrrolylglyoxylamido)penicillanic acid, is found to weigh 75 gms., to melt with decomposition at 120°–150° C., to contain the β-lactam structure as shown by infrared analysis and to inhibit *Staph. aureus* Smith at a concentration of 1.6 mcg./ml.

EXAMPLE 10

*Preparation of potassium 6-[α-hydroxy-α-(N-methyl-2-pyrrolyl)acetamido]penicillanate*

To an ice-cold solution of 6-(N-methyl-2-pyrrolylglyoxylamido)penicillanic acid (70 gm. of product of Example 9 above) in 500 ml. distilled water and sodium acetate trihydrate (27.2 gm.) there is added $NaBH_4$ (7.4 gm.; 0.2 mole) in portions such that the temperature does not exceed 10° C. and no reaction mixture is lost by foaming. During the addition, which requires about one hour, the pH is kept at about 8 by the dropwise addition of glacial acetic acid. Ether is added intermittently as needed to prevent foaming by lowering surface tension. After addition of the $NaBH_4$ is completed, the mixture is stirred in the ice bath for about 10 minutes, then ½ hour with the ice bath removed and transferred to a separatory funnel and extracted with 500 ml. ether. The aqueous phase is then layered with 400 ml. of ether and is then adjusted to pH 2 by the addition of 40% $H_3PO_4$ while being maintained cold in an ice bath. The ethereal extract containing the product, 6-[α-hydroxy-α-(N-methyl-2-pyrrolyl)acetamido]penicillanic acid, is then washed with 400 ml. portions of water and dried briefly over anhydrous $Na_2SO_4$ and filtered. The potassium salt is formed and precipitated as an oil by the addition of about 40 ml. of 40% potassium 2-ethylhexanoate in n-butanol. The solvent is decanted and the oil triturated with n-butanol whereupon the salt crystallizes. The potassium 6-[α-hydroxy-α-(N-methyl-2-pyrrolyl)acetamido]penicillanate is collected by filtration and found to weigh 20.0 gm. The product is then dissolved in a mixture of 200 ml. n-butanol and 20 ml. water. The water is removed from the solution by azeotropic distillation and the product precipitates, is collected by filtration and found to contain the β-lactam structure and to differ from the starting keto penicillin as shown by infrared analysis (absence of

band in the infrared spectrum), to melt with decomposition at 228°–229° C. and to inhibit *Staph. aureus* Smith at a concentration of 0.4 mcg./ml.

EXAMPLE 11

In the general procedure of Example 2, the 2-pyrrolylglyoxylic acid chloride is replaced by 0.13 mole 5-chloro-2-pyrrolylglyoxylic acid chloride,
5-methyl-2-pyrrolylglyoxylic acid chloride,
5-phenyl-3-chloro-2-pyrrolyglyoxylic acid chloride,
4-orthochlorophenyl-2-pyrrolylglyoxylic acid chloride,
5-nitrophenyl-2-pyrrolylglyoxylic acid chloride,
3,5-dimethyl-4-ethyl-2-pyrrolylglyoxylic acid chloride,
5-cyclohexyl-2-pyrrolylglyoxylic acide chloride,
5-diethylamino-2-pyrrolylglyoxylic acid chloride,
4-methylsulfonyl-2-pyrrolylglyoxylic acid chloride,
3-ethylthio-2-pyrrolylglyoxylic acid chloride, and
4-cycloheptyloxy-2-pyrrolylglyoxylic acide chloride, respectively, to produce 6(5-chloro-2-pyrrolylglyoxylamido)penicillanic acid,
6-(5-methyl-2-pyrrolylglyoxylamido)penicillanic acid,
6-(5-phenyl-3-chloro-2-pyrrolylglyoxylamido)penicillanic acid,
6-(4-orthochlorophenyl-2-pyrrolylglyoxylamido) penicillanic acid,
6-(5-nitrophenyl-2-pyrrolylglyoxylamido)penicillanic acid,
6-(3,5-dimethyl-4-ethyl-2-pyrrolylglyoxylamido) penicillanic acid,
6-(5-cyclohexyl-2-pyrrolylglyoxylamido)penicillanic acid,
6-(5-diethylamino-2-pyrrolylglyoxylamido)penicillanic acid,
6-(4-methylsulfonyl-2-pyrrolylglyoxylamido)penicillanic acid,
6-(3-ethylthio-2-pyrrolylglyoxylamido)penicillanic acid, and
6-(4-cycloheptyloxy-2-pyrrolylglyoxylamido)penicillanic acid, respectively, which are isolated as their water-soluble potassium salts, and found to contain the β-lactam ring as shown by infrared analysis and to inhibit *Staph. aureus* Smith at concentrations of 0.001% by weight.

The substituted pyrrolylglyoxylic acid chlorides used in the preparation of the above α-keto penicillin are prepared according to the general procedures described in Examples 1, 5 and 8 above or by the reaction of thionyl chloride with the appropriate substituted glyoxylic acid which may be prepared in accordance with the procedures illustrated in the literature, e.g. J. Amer. Chem. Soc., 66, 1646 (1944).

EXAMPLE 12

In the general procedure of Example 3, the potassium salt of 6-(2-pyrrolylglyoxylamido)penicillanic acid is replaced by 0.1 mol 6-(5-chloro-2-pyrrolylglyoxylamido)penicillanic acid,
6-(5-methyl-2-pyrrolylglyoxylamido)penicillanic acid,
6-(5-phenyl-3-chloro-2-pyrrolylglyoxylamido)penicillanic acid,
6-(4-orthochlorophenyl-2-pyrrolylglyoxylamido) penicillanic acid,
6-(5-nitrophenyl-2-pyrrolylglyoxylamido)penicillanic acid,
6-(3,5-dimethyl-4-ethyl-2-pyrrolylglyoxylamido) penicillanic acid,
6-(5-cyclohexyl-2-pyrrolylglyoxylamido)penicillanic acid,
6-(5-diethylamino-2-pyrrolylglyoxylamido)penicillanic acid,
6-(4-methylsulfonyl-2-pyrrolylglyoxylamido)penicillanic acid,
6-(3-ethylthio-2-pyrrolylglyoxylamido)penicillanic acid, and
6-(4-cycloheptyloxy-2-pyrrolylglyoxylamido)penicillanic acid, respectively, to produce the acids 6-(5-chloro-2-pyrrolylglycolamido)penicillanic acid,
6-(5-methyl-2-pyrrolylglycolamido)penicillanic acid,
6-(5-phenyl-3-chloro-2-pyrrolylglycolamido)penicillanic acid,
6-(4-orthochlorophenyl-2-pyrrolylglycolamido) penicillanic acid,
6-(5-nitrophenyl-2-pyrrolylglycolamido)penicillanic acid,
6-(3,5-dimethyl-4-ethyl-2-pyrrolylglycolamido) penicillanic acid,
6-(5-cyclohexyl-2-pyrrolylglycolamido)penicillanic acid,
6-(5-diethylamino-2-pyrrolylglycolamido)penicillanic acid,
6-(4-methylsulfonyl-2-pyrrolylglycolamido)penicillanic acid,
6-(3-ethylthio-2-pyrrolylglycolamido)penicillanic acid, and
6-(4-cycloheptyloxy-2-pyrrolylglycolamido)penicillanic acid, respectively, which are isolated as their water-soluble potassium salts, found to contain the β-lactam ring as shown by infrared analysis and to inhibit *Staph. aureus* Smith at concentrations of 0.001% by weight.

EXAMPLE 13

In the general procedure of Example 2, the 2-pyrrolylglyoxylic acid chloride is replaced by 0.13 mole N-methyl-5-methyl-2-pyrrolylglyoxylic acid chloride,
N-phenyl-3-ethyl-2-pyrrolylglyoxylic acid chloride,
N-(2-chlorophenyl)-2-pyrrolylglyoxylic acid chloride,
N-benzyl-5-chloro-2-pyrrolylglyoxylic acid chloride,
N-acetyl-2-pyrrolylglyoxylic acid chloride,
N-hexyl-3-pentyl-2-pyrrolylglyoxylic acid chloride,
N-methylsulfonyl-2-pyrrolylglyoxylic acid chloride,
N-cyclohexyl-2-pyrrolylglyoxylic acid chloride,
N-isopropyl-2-pyrrolyglyoxylic acid chloride,
N-phenyl-5-phenyl-2-pyrrolylglyoxylic acid chloride,
N-phenyl-3-methoxy-2-pyrrolylglyoxylic acid chloride,
N-phenyl-5-bromo-2-pyrrolylglyoxylic acid chloride,
N-(2-chlorophenyl)-5-methylthio-2-pyrrolylglyoxylic acid chloride,
N-methyl-4-diisobutylamino-2-pyrrolylglyoxylic acid chloride,
N-phenyl-5-propionylamino-2-pyrrolylglyoxylic acid chloride,
N-propyl-3,5-diethyl-2-pyrrolylglyoxylic acid chloride,
N-phenyl-5-ethylsulfonyl-2-pyrrolylglyoxylic acid chloride,
N-butyl-4-cyclopentyloxy-2-pyrrolylglyoxylic acid chloride,
N-phenyl-5-(3-trifluoromethylphenyl)-2-pyrrolylglyoxylic acid chloride, respectively, to produce 6-(N-methyl-5-methyl-2-pyrrolylglyoxylamido)penicillanic acid,
6-(N-phenyl-3-ethyl-2-pyrrolylglyoxylamido)penicillanic acid,
6-(N-2-chlorophenyl-2-pyrrolylglyoxylamido)penicillanic acid,
6-(N-benzyl-5-chloro-2-pyrrolylglyoxylamide)penicillanic acid,
6-(N-acetyl-2-pyrrolylglyoxylamido)penicillanic acid,
6-(N-hexyl-3-pentyl-2-pyrrolylglyoxylamido)penicillanic acid,
6-(N-methylsulfonyl-2-pyrrolylglyoxylamido)penicillanic acid,
6-(N-cyclohexyl-2-pyrrolylglyoxylamido)penicillanic acid,
6-(N-isopropyl-2-pyrrolylglyoxylamido)penicillanic acid,
6-(N-phenyl-5-phenyl-2-pyrrolylglyoxylamido)penicillanic acid,
6-(N-phenyl-3-methoxy-2-pyrrolylglyoxylamido)penicillanic acid,
6-(N-phenyl-5-bromo-2-pyrrolylglyoxylamido)penicillanic acid,
6-(N-2-chlorophenyl-5-methylthio-2-pyrrolylglyoxylamido)penicillanic acid,
6-(N-methyl-4-diisobutylamino-2-pyrrolylglyoxylamido)-penicillanic acid,
6-(N-phenyl-5-propionylamino-2-pyrrolylglyoxylamido)-penicillanic acid,
6-(N-propyl-3,5-diethyl-2-pyrrolylglyoxylamido)penicillanic acid,
6-(N-phenyl-5-ethylsulfonyl-2-pyrrolylglyoxylamido)-penicillanic acid,
6-(N-butyl-4-cyclopentyloxy-2-pyrrolylglyoxylamido)-penicillanic acid, and
6-(N-phenyl-5-3-trifluoromethylphenyl-2-pyrrolylglyoxylamido)penicillanic acid, respectively, which are isolated as their water-soluble potassium salts, found to contain the β-lactam ring as shown by infrared analysis and to inhibit *Staph. aureus* Smith at concentrations of 0.001% by weight.

The substituted pyrrolylglyoxylic acid chlorides used in the preparation of the above α-keto penicillin are prepared according to the general procedures described in Examples 1, 5 and 8 above or by the reaction of thionyl chloride with the appropriate substituted glyoxylic acid which may be prepared in accordance with the procedures illustrated in the literature, e.g., J. Amer. Chem. Soc., 66, 1646 (1944).

EXAMPLE 14

In the general procedure of Example 3, the potassium 6-[α-hydroxy-α-(2-pyrrolyl)acetamido]penicillanate is replaced by 0.1 mole of 6-(N-methyl-5-methyl-2-pyrrolylglyoxylamido)penicillanic acid,
6-(N-phenyl-3-ethyl-2-pyrrolylglyoxylamido)penicillanic acid,
6-(N-2-chlorophenyl-2-pyrrolylglyoxylamido)penicillanic acid,
6-(N-benzyl-5-chloro-2-pyrrolylgyloxylamido)penicillanic acid,
6-(N-acetyl-2-pyrrolylglyoxylamido)penicillanic acid,
6-(N-hexyl-3-pentyl-2-pyrrolylglyoxylamido)penicillanic acid,
6-(N-methylsulfonyl-2-pyrrolylglyoxylamido)penicillanic acid,
6-(N-cyclohexyl-2-pyrrolylglyoxylamido)penicillanic acid,
6-(N-isopropyl-2-pyrrolylglyoxylamido)penicillanic acid,
6-(N-phenyl-5-phenyl-2-pyrrolylglyoxylamido)penicillanic acid,
6-(N-phenyl-3-methoxy-2-pyrrolylglyoxylamido)penicillanic acid,
6-(N-phenyl-5-bromo-2-pyrrolylglyoxylamido)penicillanic acid,
6-(N-2-chlorophenyl-5-methylthio-2-pyrrolylglyoxylamido)penicillanic acid,
6-(N-methyl-4-diisobutylamino-2-pyrrolylglyoxylamido)-penicillanic acid,
6-(N-phenyl-5-propionylamino-2-pyrrolylglyoxylamido)-penicillanic acid,
6-(N-propyl-3,5-diethyl-2-pyrrolylglyoxylamido)penicillanic acid,
6-(N-phenyl-5-ethylsulfonyl-2-pyrrolylglyoxylamido)-penicillanic acid,
6-(N-butyl-4-cyclopentyloxy-2-pyrrolylglyoxylamido)-penicillanic acid, and
6-(N-phenyl-5-3-trifluoromethylphenyl-2-pyrrolylglyoxylamido)penicillanic acid, respectively, to produce 6-(N-methyl-5-methyl-2-pyrrolylglycolamido)penicillanic acid, 6-(N-phenyl-3-ethyl-2-pyrrolylglycolamido)penicillanic acid,
6-(N-2-chlorophenyl-2-pyrrolylglycolamido)penicillanic acid,
6-(N-benzyl-5-chloro-2-pyrrolylglycolamido)penicillanic acid,
6-(N-acetyl-2-pyrrolylglycolamido)penicillanic acid,
6-(N-hexyl-3-pentyl-2-pyrrolylglycolamido)penicillanic acid,
6-(N-methylsulfonyl-2-pyrrolylglycolamido)penicillanic acid,
6-(N-cyclohexyl-2-pyrrolylglycolamido)penicillanic acid,
6-(N-isopropyl-2-pyrrolylglycolamido)penicillanic acid,
6-(N-phenyl-5-phenyl-2-pyrrolylglycolamido)penicillanic acid,
6-(N-phenyl-3-methoxy-2-pyrrolylglycolamido)penicillanic acid,
6-(N-phenyl-5-bromo-2-pyrrolylglycolamido)penicillanic acid,
6-(N-2-chlorophenyl-5-methylthio-2-pyrrolylglycolamido)penicillanic acid,
6-(N-methyl-4-diisobutylamino-2-pyrrolylglycolamido)penicillanic acid,
6-(N-phenyl-5-propionylamino-2-pyrrolylglycolamido)penicillanic acid,
6-(N-propyl-3,5-diethyl-2-pyrrolylglycolamido)penicillanic acid,
6-(N-phenyl-5-ethylsulfonyl-2-pyrrolylglycolamido)penicillanic acid,
6-(N-butyl-4-cyclopentyloxy-2-pyrollylglycolamido)penicillanic acid, and
6-(N-phenyl-5,3-trifluoromethylphenyl-2-pyrrolylglycolamido)penicillanic acid, respectively, which are isolated as their water-soluble potassium salts, found to contain the β-lactam ring as shown by infrared analysis and to inhibit *Staph. aureus* Smith at concentrations of 0.001% by weight.

EXAMPLE 15

*Preparation of D,L-6-[α-amino(2-pyrrolyl)-acetamido]penicillanic acid*

Part A: To a stirred solution of 24.5 gms. (0.5 mole) of sodium cyanide and 113 gms. (1.18 moles) of ammonium carbonate in 335 ml. of distilled water under an inert atmosphere of nitrogen, is added, in one portion, 23.8 gms. (0.25 mole) of pyrrole-2-aldehyde in 335 ml. of absolute ethanol. The resulting slurry is stirred and heated at 50–55° C. for four hours, and then stirred for an additional 15 hours at room temperature. The insoluble salts are then removed by filtration and washed with two 50 ml. portions of absolute ethanol. The combined filtrate and washings are concentrated at 30–40° C. in vacuo to a volume of about 200 ml., cooled to 5° C., and acidified to pH 1 with 6 N HCl. After several minutes of stirring at 5° C. the product begins to crystallize, and after thirty minutes the solids are removed by filtration, recrystallized from boiling isopropanol (with decolorization by activated charcoal), and air dried. The white crystalline product, 5-(2-pyrrolyl)hydantoin monoisopropanolate, is found to weigh 25 gms. and to melt at 160–161° C.

Nuclear magnetic resonance analysis shows the product to contain one molecule of isopropanol of crystallization.

Part B: A solution of 2.25 gms. (0.01 mole) of 5-(2-pyrrolyl)hydantoin monoisopropanolate in 8 ml. of 20% aqueous NaOH is refluxed for 16 hours, cooled in an ice bath, and slowly neutralized to pH 7 with 6 N HCl. Filtration yields 0.9 gm. of grey solid which is suspended in 10 ml. of water, dissolved by acidifying to pH 1 with 6 N HCl, and stirred for three minutes with one gram of decolorizing charcoal. The mixture is filtered, and the cooled filtrate is adjusted to pH 7 with solid sodium bicarbonate. The resulting crystalline solid is recovered by filtration, washed with water and acetone, and air-dried. The product, D,L-α-amino-(2-pyrrolyl)acetic acid, is found to weigh 0.130 gm., and to decompose at 202–203° C.

Part C: N-carbobenzoxy chloride (10 gms.; 0.59 mole) is slowly added to a cooled solution of 7 gms. (0.05 mole) of D,L-α-amino(2-pyrrolyl)acetic acid in 100 ml. (0.1 mole) of 4% aqueous NaOH, with vigorous stirring, while maintaining the temperature at 3–5° C. The slurry is stirred for an additional hour at 5–10° C., and the pH is then adjusted to 8 with a small amount of 50% aqueous NaOH. The resulting solution is extracted with three 100 ml. portions of ethyl ether which are discarded, and the aqueous phase is acidified to pH 2 with 40% $H_3PO_4$ and again extracted with three 100 ml. portions of ether. The combined ether layers are washed with three 50 ml. portions of saturated aqueous $Na_2SO_4$ solution, dried over anhydrous sodium sulfate, and the ether is removed at 30° C. by distillation in vacuo. The resulting solid is washed with n-pentane, removed by filtration, and air-dried. The product, α-(N-carbobenzoxyamino)-(2-pyrrolyl)acetic acid, weighs 14 gms. and decomposes at 170–175° C.

Part D: A solution of 6.8 gms. (0.05 mole) of isobutyl chloroformate in 25 ml. of tetrahydrofuran is slowly added with stirring to a cooled solution of 13.5 gms. (0.05 mole) of α-(N-carbobenzoxyamino)-(2-pyrrolyl)acetic acid and 5.4 gms. (0.05 mole) of 2,6-lutidine in 100 ml. of tetrahydrofuran, while maintaining the temperature at −10° C. After stirring for an additional ten minutes, an ice-cold slurry of 10.8 gms. (0.05 mole) of 6-aminopenicillanic acid in a mixture of 30 ml. of water and 7 ml. of 2,6-lutidine is added in one portion, whereupon the temperature of the mixture immediately rises to 5° C., and $CO_2$ is evolved. The cooling bath is removed and the mixture is allowed to slowly rise to room temperature (1 hour) while stirring, and stirring is continued for another hour at room temperature. The pH of the mixture is adjusted to 8 with triethylamine and 500 ml. of water is added. The resulting solution is extracted with two 300 ml. portions of ethyl ether which are discarded, and the aqueous phase is cooled in an ice bath, slowly acidified to pH 2 with 40% aqueous $H_3PO_4$ and again extracted with two 300 ml. portions of ether. The combined ether extracts are washed with three 100 ml. portions of distilled water and dried over anhydrous sodium sulfate. The resulting ether solution is treated with 25 ml. of a 50% solution of potassium 2-ethylhexanoate in n-butanol. An oily layer separates, and this is allowed to settle for fifteen minutes while cooling in an ice-bath. The ether is decanted, and the oily layer is dissolved in 500 ml. of ethyl acetate. This solution is concentrated to 100 ml. by distillation at 30° C. in vacuo, and one liter of dry ether is added. The resulting solid precipitate is recovered by filtration, washed with dry ether, and dried in vacuo. The product, the potassium salt of D,L-6-[α-(N-carbobenzoxyamino - 2 - pyrrolyl)-acetamido]penicillanic acid, weighs 18 gms. (72% of theory).

Part E: A solution of 15 gms. (0.03 mole) of the potassium salt of D,L-6-[α-(N-carbobenzoxyamino-2-pyrrolyl)acetamido]penicillanic acid in 150 ml. of water is hydrogenated for twenty minutes at 50 p.s.i.g., using 15 gms. of 30% palladium on diatomaceous earth as catalyst. The pH of the mixture is adjusted to 2 with a small amount of 40% aqueous $H_3PO_4$, and the mixture is filtered to remove catalyst. The filtrate is concentrated in vacuo to 25 ml. and is filtered to remove any insoluble material. To the resulting filtrate is added 50 ml. of acetone, and, after shaking, the acetone layer is removed from the nearly saturated aqueous salt solution. The acetone solution is evaporated at 25° C. in vacuo to near dryness, to yield an oil. This oil is further dried by two successive treatments with methyl isobutyl ketone, whereby any remaining water is removed by azeotropic distillation in vacuo. The resulting semi-solid is washed with dry acetone and filtered to give 7 gms. of product which decomposes at 210° C. The crude product (3.5 gms.) is slurried in 25 ml. of water and is dissolved by adjusting the pH to 2 with 6 N HCl. Two gms. of decolorizing charcoal are added and, after stirring for two minutes, the mixture is filtered and the solids are washed with two 5 ml. portions of water. The filtrate and washings are combined, and the pH is adjusted to 5 with a few drops of 50% aqueous NaOH solution. Upon cooling, the desired product crystallizes, is recovered by filtration, and is dried in vacuo. The product, D,L-6-[α-amino-(2-pyrrolyl)acetamido]penicillanic acid, weighs 0.52 gms. melts with decomposition at 230° C., and inhibits *Staph. aureus* Smith at a concentration of 0.25 mcg./ml.

EXAMPLE 16

In the procedure of Example 15, the α-amino-α-(2-pyrrolyl)acetic acid is replaced by α-Amino-α-(N-phenyl-2-pyrrolyl)acetic acid,
α-Amino-α-(N-methyl-2-pyrrolyl)acetic acid,
α-Amino-α-(3-chloro-2-pyrrolyl)acetic acid,
α-Amino-α-(5-cyclohexyl-2-pyrrolyl)acetic acid,
α-Amino-α-(3,5-dimethyl-2-pyrrolyl)acetic acid,
α-Amino-α-(N-benzyl - 3 - dimethylamino-2-pyrrolyl)acetic acid,
α-Amino-α-(4-phenyl-2-pyrrolyl)acetic acid,
α-Amino-α (5-diethylamino-2-pyrrolyl)acetic acid,
α-Amino-α-(3,5-dimethoxy-2-pyrrolyl)acetic acid,
α-Amino-α-(N-phenyl-4-phenyl-2-pyrrolyl)acetic acid,
α-Amino-α-(4-methylthio-2-pyrrolyl)acetic acid,
α-Amino-α-(N-acetyl-2-pyrrolyl)acetic acid, and
α-Amino-α-(5-nitro-2-pyrrolyl)acetic acid, and there is produced thereby 6-[α-amino-α-(N-phenyl - 2 - pyrrolyl)acetamido]penicillanic acid,
6-[α-amino-α-(N-methyl - 2 - pyrrolyl)acetamido]penicillanic acid,
6-[α-amino-α-(3-chloro - 2 - pyrrolyl)acetamido]penicillanic acid,
6 - [α-amino-α-(5-cyclohexyl-2-pyrrolyl)acetamido]penicillanic acid,
6 - [α-amino-α-(3,5-dimethyl-2-pyrrolyl)acetamido]penicillanic acid,
6-[α-amino-α-(N-benzyl - 3 - dimethylamino-2-pyrrolyl)-acetamido]penicillanic acid,
6-[α-amino-α-(4-phenyl - 2 - pyrrolyl)acetamido]penicillanic acid,
6-[α-amino-α-(5-diethylamino - 2 - pyrrolyl)acetamido]-penicillanic acid,
6-[α-amino-α-(3,5-dimethoxy - 2 - pyrrolyl)acetamido)-penicillanic acid,
6 - [α-amino-α-(1,4-diphenyl-2-pyrrolyl)acetamido]penicillanic acid,
6 - [α-amino-α-(4-methylthio-2-pyrrolyl)acetamido]penicillanic acid,
6-[α-amino-α-(N-acetyl - 2 - pyrrolyl)acetamido]penicillanic acid, and
6 - [α-amino-α-(5-nitro-2-pyrrolyl)acetamido]penicillanic acid, respectively, each of which is isolated and found to contain the β-lactam ring as shown by infrared analysis and to inhibit *Staph. aureus* Smith at concentrations of 0.001% by weight.

EXAMPLE 17

DL-α-carbobenzoxyamino-α-(2-pyrrolyl)acetic acid is prepared as in Example 15 and is resolved to produce D(−)-α-carbobenzoxyamino - α - (2-pyrrolyl)acetic acid and L(+)-α-carbobenzoxyamino - α - (2-pyrrolyl)acetic acid, each of which is used in place of DL-α-carbobenzoxyamino-α-(2-pyrrolyl)acetic acid in the procedure of Example 15 (Parts D and E) to produce D(−)-6-[α-amino - α - (2-pyrrolyl)acetamido]penicillanic acid, and L(+)-6-[α-amino-α-(2 - pyrrolyl)acetamido]penicillanic acid, respectively. Both products are isolated as solids, found to contain the β-lactam ring as shown by infrared analysis and to inhibit *Staph. aureus* Smith at a concentration of 0.001% by weight.

I claim:

1. A compound selected from the group consisting of the acids having the formula

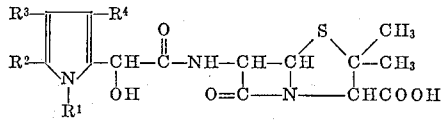

wherein $R^1$ is a member selected from the group consisting of hydrogen, (lower)alkyl, phenyl, chlorophenyl, phenethyl, (lower)alkanoyl, (lower)alkylsulfonyl and cycloalkyl having from 5 to 7 carbon atoms inclusive and wherein $R^2$, $R^3$ and $R^4$ are each a member selected from the group consisting of hydrogen, chloro, bromo, fluoro, iodo, nitro, (lower)alkyl, (lower)alkoxy, (lower)-alkylthio, di(lower)alkylamino, (lower)alkanoylamino, (lower)alkanoyl and (lower)alkylsulfonyl; and the pharmaceutically acceptable nontoxic salts thereof.

2. 6 - [α - hydroxy - α - (2 - pyrrolyl)acetamido]penicillanic acid.

3. 6 - [α - hydroxy - α - (N - phenyl - 2 - pyrrolyl)-acetamido]penicillanic acid.

4. 6 - [α - hydroxy - α - (N - methyl - 2 - pyrrolyl)-acetamido]penicillanic acid.

5. A compound selected from the group consisting of the acids having the formula

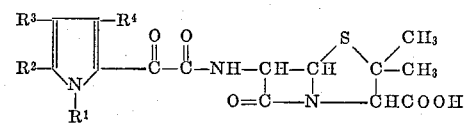

wherein $R^1$ is a member selected from the group consisting of hydrogen, (lower)alkyl, phenyl, chlorophenyl, phenethyl, (lower)alkanoyl, (lower)alkylsulfonyl and cycloalkyl having from 5 to 7 carbon atoms inclusive and wherein $R^2$, $R^3$ and $R^4$ are each a member selected from the group consisting of hydrogen, chloro, bromo, fluoro, iodo, nitro, (lower)alkyl, (lower)alkoxy, (lower)-alkylthio, di(lower)alkylamino, (lower)alkanoylamino, (lower)alkanoyl and (lower)alkylsulfonyl; and the pharmaceutically acceptable nontoxic salts thereof.

6. 6 - (2 - pyrrolylglyoxylamido)penicillanic acid.

7. 6 - (N - phenyl - 2 - pyrrolylglyoxylamido)penicillanic acid.

8. 6 - (N - methyl - 2 - pyrrolylglyoxylamido)penicillanic acid.

9. A compound selected from the group consisting of the acids having the formula

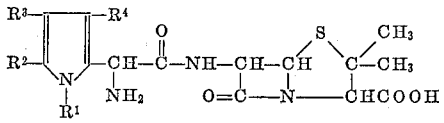

wherein $R^1$ is a member selected from the group consisting of hydrogen, (lower)alkyl, phenyl, chlorophenyl, phenethyl, (lower)alkanoyl, (lower)alkylsulfonyl and cycloalkyl having from 5 to 7 carbon atoms inclusive and wherein $R^2$, $R^3$ and $R^4$ are each a member selected from the group consisting of hydrogen, chloro, bromo, fluoro, iodo, nitro, (lower)alkyl, (lower)alkoxy, (lower)-alkylthio, di(lower)alkylamino, (lower)alkanoylamino, (lower)alkanoyl and (lower)alkylsulfonyl; and the pharmaceutically acceptable nontoxic salts thereof.

10. 6 - [α - amino - α - (2 - pyrrolyl)acetamido]penicillanic acid.

No references cited.

NICHOLAS S. RIZZO, *Primary Examiner.*